(12) United States Patent
Kanbe et al.

(10) Patent No.: US 6,920,901 B2
(45) Date of Patent: Jul. 26, 2005

(54) HEAT RESISTANT FUEL HOSE

(75) Inventors: Shinobu Kanbe, Komaki (JP);
Takahiro Nishiyama, Kasugai (JP)

(73) Assignee: Tokai Rubber Industries, Ltd., Komaki (JP)

( * ) Notice: Subject to any disclaimer, the term of this patent is extended or adjusted under 35 U.S.C. 154(b) by 125 days.

(21) Appl. No.: 10/393,932

(22) Filed: Mar. 20, 2003

(65) Prior Publication Data

US 2003/0188793 A1 Oct. 9, 2003

(30) Foreign Application Priority Data

Mar. 28, 2002 (JP) .............................. 2002-090990

(51) Int. Cl.⁷ ............................................. F16L 11/00
(52) U.S. Cl. ..................... 138/126; 138/137; 428/36.91
(58) Field of Search ............................. 138/126, 137, 138/141, 123; 428/36.91

(56) References Cited

U.S. PATENT DOCUMENTS

| | | | |
|---|---|---|---|
| 4,870,995 A | * 10/1989 | Igarashi et al. | 138/126 |
| 5,013,783 A | 5/1991 | Thormer et al. | |
| 5,051,480 A | * 9/1991 | Coran | 525/227 |
| 5,077,108 A | * 12/1991 | Ozawa et al. | 428/36.2 |
| 5,158,113 A | * 10/1992 | Ozawa et al. | 138/137 |
| 5,316,046 A | * 5/1994 | Igarashi et al. | 138/136 |
| 5,380,571 A | * 1/1995 | Ozawa et al. | 428/36.9 |
| 5,795,635 A | * 8/1998 | Iwasaki | 428/36.3 |
| 5,830,941 A | * 11/1998 | Aimura et al. | 524/456 |
| 5,830,946 A | * 11/1998 | Ozawa et al. | 525/65 |
| 6,489,385 B1 | * 12/2002 | Fujii et al. | 524/186 |
| 6,492,454 B1 | * 12/2002 | Ozawa et al. | 524/493 |
| 2003/0166789 A1 | * 9/2003 | Aimura et al. | 525/329.1 |
| 2003/0187146 A1 | * 10/2003 | Kanbe | 525/329.1 |

FOREIGN PATENT DOCUMENTS

| | | |
|---|---|---|
| EP | 0 711 656 A1 | 5/1996 |
| EP | 0 962 311 A1 | 12/1999 |
| EP | 1 048 453 A2 | 11/2000 |
| EP | 1 108 528 A2 | 6/2001 |
| JP | 2-107657 * | 4/1990 |
| JP | 09-112756 A1 | 5/1997 |
| JP | 09-124845 A1 | 5/1997 |
| JP | 11-028788 A1 | 2/1999 |
| JP | 11-325332 A1 | 11/1999 |
| JP | 2001-279021 A1 | 10/2001 |

OTHER PUBLICATIONS

Searching PAJ; Patent Abstracts of Japan; Publication No. 09–112756 (English translation of the abstract) May 1997.

Searching PAJ; Patent Abstracts of Japan; Publication No. 09–124845 (English translation of the abstract), May 1997.

Searching PAJ; Patent Abstracts of Japan; Publication No. 11–028788 (English translation of the abstract), Feb. 1999.

Searching PAJ; Patent Abstracts of Japan; Publication No. 11–325332 (English translation of the abstract); Nov. 1999.

Search PAJ; Patent Abstracts of Japan; Publication No. 2001–279021 (English translation of the abstract) ; Oct. 2001.

* cited by examiner

*Primary Examiner*—James Hook
(74) *Attorney, Agent, or Firm*—Darby & Darby

(57) ABSTRACT

The present invention provides a heat resistant fuel hose comprising a rubber inner pipe with an inner layer and an outer layer in the inner pipe. The inner layer of the inner pipe comprises a hydrogenated acrylonitrile butadiene rubber (H-NBR) that is mixed with zinc oxide (ZnO) and magnesium oxide (MgO) as acid acceptors and is peroxide vulcanized. The outer layer of the inner pipe comprises an epoxy cross-linking type acrylic rubber (ACM) that has been vulcanized bonded to the inner layer of the inner pipe. The inner layer and outer layer of the inner pipe of the heat resistant fuel hose of the present invention are strongly bonded, and the rubber inner pipe has excellent heat resistance.

18 Claims, 1 Drawing Sheet

HEAT RESISTANT FUEL HOSE

BACKGROUND OF THE INVENTION

1. Field of the Invention

The present invention provides a heat resistant fuel hose. More specifically, the present invention provides a heat resistant fuel hose having a rubber inner pipe in which vulcanized bonding of hydrogenated acrylonitrile butadiene rubber (H-NBR) and acrylic rubber (ACM) has been performed.

2. Description of the Related Art

In recent years, there has been a demand for fuel hoses with heat resistance and fuel resistance. For example, due to exhaust gas countermeasures, front wheel drive, and the like, the temperature inside the engine housing of automobiles has become more severe. Due to the advances of low fuel consumption, there has been a dramatic rise in the level of heat resistance demanded by the peripheral parts of diesel engines. As a result, diesel fuel hoses, for example, require high heat resistance at around 150° C. for 500 hours.

Methods of using acrylonitrile butadiene rubber (NBR) or acrylic rubber (ACM) in the inner pipe of the fuel hose do not always adequately satisfy the heat resistance and fuel resistance requirements. These methods are particularly inadequate for diesel fuel hoses. Adequate heat and fuel resistance is achieved by using fluorine rubber (FKM). However, FKM is very expensive, and there are problems with inadequate cold resistance and the inadequate workability of the non-vulcanized molded body.

On the other hand, of the nitrile rubbers, H-NBR in which the butadiene units of NBR are completely or partially hydrogenated has excellent heat resistance, fuel resistance, and cold resistance. . Although H-NBR is relatively expensive, the cost is more reasonable compared to FKM. By using the relatively expensive H-NBR in the inner layer of the inner pipe of the hose and by using an inexpensive rubber having some heat resistance and fuel resistance (such as ACM, preferably) for the outer layer of the inner pipe of the hose, the layer of H-NBR can be thinner. The amount of H-NBR is reduced, and this construction is more practical.

References such as Japanese Laid-Open Patent Publication No. 9-124845, Japanese Laid-Open Patent Publication No. 9-112756, and Japanese Laid-Open Patent Publication No. 2001-279021 disclose hoses using H-NBR mixtures and H-NBR mixtures for use in hoses and the like. In addition, Japanese Laid-Open Patent Publication No. 11-325332 discloses a hose having an innermost layer of H-NBR and an outer layer of ACM which is vulcanized and molded to form a unitary body.

When constructing a heat resistant fuel hose having a rubber inner pipe with an inner layer of H-NBR and an outer layer of ACM in the inner pipe, the inner layer in the inner pipe needs to be securely bonded with the outer layer in the inner pipe, preferably by vulcanized bonding. At the same time, it is preferable to improve the heat resistance of the rubber inner pipe as much as possible.

Japanese Laid-Open Patent Publication No. 9-124845, Japanese Laid-Open Patent Publication No. 9-112756, and Japanese Laid-Open Patent Publication No. 2001-279021 described above disclose ways to improve the H-NBR mixtures according to each of their technical objectives. Ways to improve heat resistance in general are also disclosed in these references. However, the references do not disclose ways to improve bonding between H-NBR and ACM while simultaneously improving the heat resistance of H-NBR.

Japanese Laid-Open Patent Publication No. 11-325332 described above discloses a hose having vulcanized bonding between the H-NBR layer and the ACM layer by peroxide vulcanization of H-NBR. The peroxide vulcanization is considered to be beneficial for improving the heat resistance of H-NBR. However, according to the research of the present inventors, the carboxyl group cross-linking type of ACM used in the disclosed invention does not always achieve strong vulcanized bonding with H-NBR. In addition, the method of peroxide vulcanization of H-NBR does not particularly improve the bonding of the two layers.

Furthermore, although the mixing of silica filler into H-NBR may improve the vulcanized bonding with ACM, the workability of the non-vulcanized molded body remains inadequate.

SUMMARY OF THE INVENTION

The present invention provides a heat resistant fuel hose having a rubber inner pipe equipped with an inner layer of H-NBR and an outer layer of ACM. The inner layer and outer layer of the inner pipe are strongly bonded, and the rubber inner pipe has excellent heat resistance.

An embodiment of the present invention provides a heat resistant fuel hose comprising a rubber inner pipe with an inner layer and an outer layer. The inner layer of the inner pipe comprises a hydrogenated acrylonitrile butadiene rubber (H-NBR) that is mixed with zinc oxide (ZnO) and magnesium oxide (MgO) as acid acceptors and is peroxide vulcanized. The outer layer of the inner pipe comprises an acrylic rubber of an epoxy cross-linking type that is vulcanized bonded to the inner layer of the inner pipe.

The heat resistant fuel hose of the embodiment described above has H-NBR in the inner layer and a relatively inexpensive ACM in the outer layer of the inner pipe of the hose. H-NBR has excellent heat resistance, fuel resistance, cold resistance, and the like. ACM has a constant heat resistance and fuel resistance. Thus, the present invention provides a heat resistant fuel hose with excellent heat resistance, fuel resistance, and the like without too much added expense. Furthermore, because the H-NBR in the inner layer of the inner pipe is peroxide vulcanized, the heat resistance is improved even more.

Additionally, ZnO and MgO, which are acid acceptors, are mixed with the H-NBR, which is to be peroxide vulcanized, and an epoxy cross-linking type of ACM, which is to be vulcanized bonded with H-NBR, is used in the outer layer of the inner pipe. According to the research of the present inventors, the inner layer and the outer layer of the inner pipe constructed as described above are securely vulcanized bonded. Although the reason for this is still not clear, we suspect that the MgO, which is an acid acceptor, forms a pseudo-cross link with the epoxy cross-link type ACM, thereby increasing the bonding strength. By also using ZnO, which is also an acid acceptor, a good compression set resistance is achieved.

Japanese Laid-Open Patent Publication No. 9-124845 mentioned above discloses a step for mixing ZnO or MgO into H-NBR. Additionally, Japanese Laid-Open Patent Publication No. 2001-279021 discloses an embodiment in which ZnO and MgO are mixed into H-NBR. However, these references disclose mixtures which are unrelated to the vulcanized bonding of H-NBR and ACM and do not disclose the contribution of these acid acceptors to the vulcanized bonding of H-NBR and ACM.

According to another embodiment of the present invention, the mixing amount of ZnO into the H-NBR in the inner layer of the inner pipe as described above is 2 phr (weight parts per hundred weight parts of rubber) or greater and the mixing amount of MgO is 4 phr or greater.

Although the mixing amount of ZnO and MgO in H-NBR in the inner layer of the inner pipe is not restricted, the mixing amount of ZnO is preferably 2 phr or greater and the mixing amount of MgO is preferably 4 phr or greater. When the mixing amount of MgO is less than 4 phr, the strength of the vulcanized bond between the inner layer and outer layer of the inner pipe may be inadequate from a practical standpoint. Additionally, when the mixing amount of ZnO is less than 2 phr, the improvement in the compression set resistance of H-NBR may be inadequate from a practical standpoint.

According to another embodiment of the present invention, the mixing amount of ZnO in the H-NBR in the inner layer of the inner pipe as described above is 2–10 phr, and the mixing amount of MgO is 4–15 phr.

More preferably, the mixing amounts of ZnO and MgO in H-NBR are 2–10 phr for ZnO and 4–15 phr for MgO. If there is an amount of ZnO and MgO outside of this range, the workability or the like of the non-vulcanized molding body may be unsatisfactory.

According to another embodiment of the present invention, a vulcanizing agent or vulcanization accelerator such as ammonium salt is mixed into the ACM in the outer layer of the inner pipe described above.

When ammonium salt is mixed into the ACM of the outer layer of the inner pipe as the vulcanizing agent or vulcanization accelerator, the vulcanized bond strength between the inner layer and outer layer of the inner pipe is further improved. The improvement is most likely the result of an increased speed of vulcanization.

According to another embodiment of the present invention, the vulcanizing agent or vulcanization accelerator described above is a compound or compound group of one of the following (1)–(3) or a combination of two or more of any of (1)–(3):

(1) ammonium benzoate;
(2) isocyanuric acid, quaternary ammonium salt, and diphenyl urea; and
(3) imidazole, thiourea, and quaternary ammonium salt.

Although the type of vulcanizing agent or vulcanization accelerator used as described above is not restricted, it is preferably a compound or compound group in one of (1)–(3) or a combination of two or more of any of (1)–(3).

According to another embodiment of the present invention, the heat resistant fuel hose described above has a reinforcement thread layer and a rubber outer pipe on the outer perimeter of the rubber inner pipe.

The construction of the heat resistant fuel hose is not restricted as long as the fuel hose has a rubber inner pipe constructed as described above. However, the fuel hose preferably has a reinforcement thread layer and a rubber outer pipe on the outer periphery of the rubber inner pipe.

According to another embodiment of the present invention, the heat resistant fuel hose described above is a diesel fuel hose.

As described above, because the inside of the engine housing of an automobile experiences extremely hot temperatures due to exhaust gas countermeasures, front wheel drive, and the like, the heat resistant fuel hose can be used as a typical fuel hose. The fuel hose described above is especially useful as a diesel fuel hose for use in diesel engines. There has been a dramatic increase in the level of heat resistance demanded of the peripheral parts of diesel engines due to designs for low fuel consumption and the like.

BRIEF DESCRIPTION OF THE DRAWINGS

The foregoing and other features of the present invention will be more apparent from the following detailed description and drawings of the illustrative embodiments of the invention wherein like reference numbers refer to similar elements and in which.

DETAILED DESCRIPTION OF THE INVENTION

Heat Resistant Fuel Hose

Figure 1:
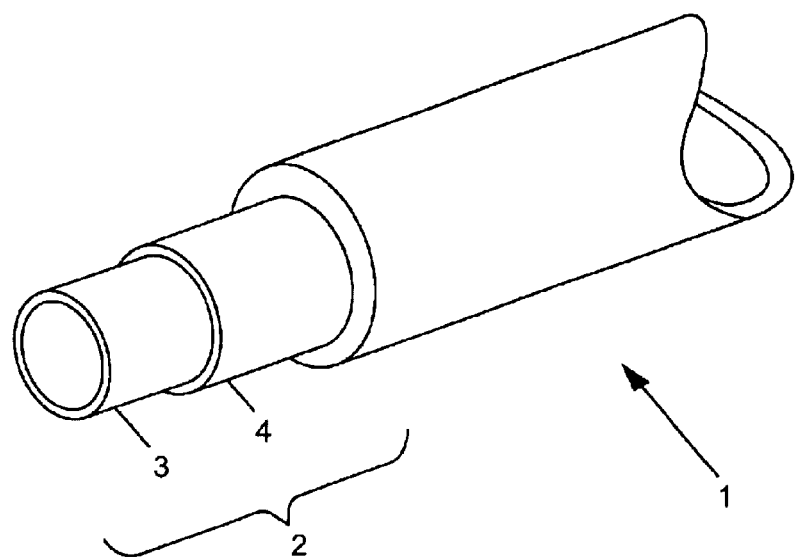
FIG. 1 shows a heat resistant fuel hose including an inner pipe with an inner layer and an outer layer, according to an embodiment of the present invention.

FIG. 1 shows a heat resistant fuel hose 1 according to an embodiment of the present invention. The heat resistant fuel hose 1 of the present invention comprises a rubber inner pipe 2 with an inner layer 3 of a hydrogenated acrylonitrile butadiene rubber (H-NBR) and an outer layer 4 of an acrylic rubber (ACM). This rubber inner pipe 2 is the innermost layer of the heat resistant fuel hose 1. The H-NBR of the inner layer 3 of the inner pipe 2 is mixed with zinc oxide (ZnO) and magnesium oxide (MgO) as acid acceptors and is then peroxide vulcanized. The ACM of the outer layer 4 of the inner pipe 2 is an epoxy cross-linking type ACM which is vulcanized bonded to the inner layer 3 of the inner pipe 2.

Figure 2:
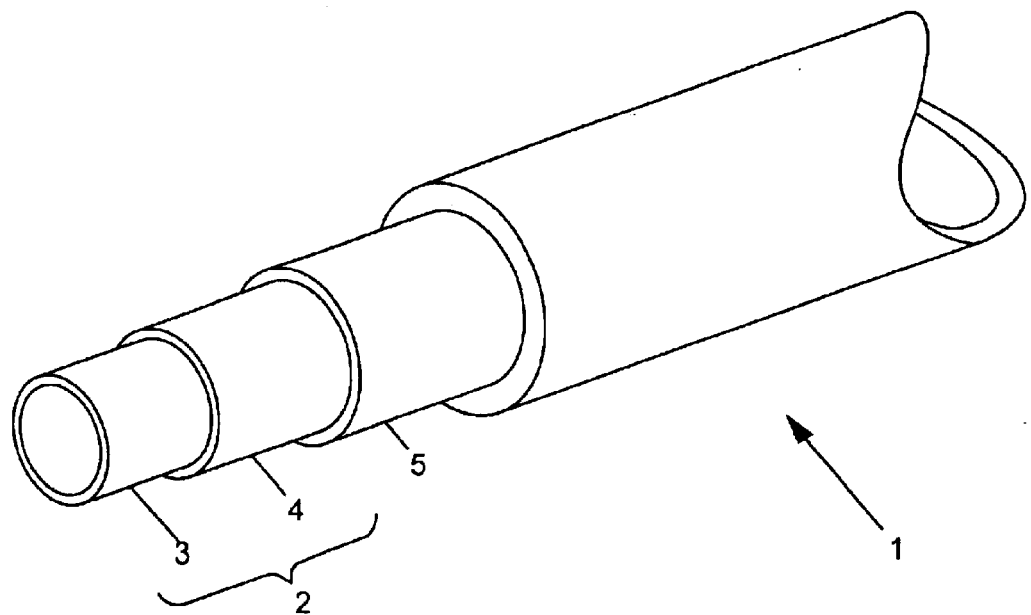
FIG. 2 shows a heat resistant fuel hose including an inner pipe with an inner layer and an outer layer and an additional layer on the outer perimeter of the inner pipe, according to another embodiment of the present invention.

FIG. 2 shows a heat resistant fuel hose 1 according to another embodiment of the present invention. The construction of the heat resistant fuel hose of the present invention is not restricted provided the inner pipe 2 is constructed as described above. For example, as shown in FIG. 2, an additional layer 5, such as a reinforcement thread layer (or reinforcement wire layer) of any substance, a rubber layer, a resin layer, and the like can be included in any sequence on the outer perimeter of the rubber inner pipe 2. More preferably, a reinforcement thread layer and a rubber outer pipe are provided sequentially on the outer perimeter of the rubber inner pipe 2. The rubber outer pipe can be constructed by any type of rubber. However, examples of the type of rubber used in the rubber outer pipe include ACM, acrylonitrile butadiene rubber (NBR), blend material of NBR and polyvinyl chloride (NBR-PVC), ethylene propylene diene rubber (EPDM), ethylene propylene rubber (EPM), chlorinated polyethylene rubber (CM), chlorosulfonated polyethylene rubber (CSM), chloroprene rubber (CR), or blend rubber of two or more types selected from these types of rubber.

The usage of the heat resistant fuel hose is not restricted as long as it us used for fuel transport. However, the fuel hose is preferably used in an environment that requires heat resistance, and therefore, diesel fuel hoses are especially preferred.

Inner Layer of the Inner Pipe

H-NBR used in the inner layer 3 of the inner pipe 2 of the present invention is a hydrogenated or partially hydrogenated unsaturated nitrile-conjugated diene copolymer rubber. The H-NBR in the present invention comprises (a) a unit portion of unsaturated nitrite, (b) a unit portion of conjugated diene, and (c) a unit portion in which a unit portion of an ethylene unsaturated monomer other than unsaturated nitrite and/or the unit portion of conjugated diene is hydrogenated. The composition ratio of H-NBR for (a) the unit portion of unsaturated nitrite, (b) the unit portion of conjugated diene, and (c) the unit portion comprising the hydrogenated unit portion of an ethylene unsaturated monomer other than unsaturated nitrile and/or the unit portion of conjugated diene is not restricted. However, with respect to heat resistance, fuel resistance, oil resistance, and cold resistance, a copolymer rubber with 25–45% by weight of the unit portion of unsaturated nitrite, 5% by weight or less of the unit portion of conjugated diene, and 50–75% by weight of the unit portion of the hydrogenated unit portion of an ethylene unsaturated monomer other than unsaturated nitrite and/or the unit portion of conjugated diene is preferred.

ZnO and MgO are both mixed into H-NBR as acid acceptors. For the reasons stated above, the mixing amount of ZnO is preferably 2 phr or greater, and the mixing amount of MgO is 4 phr or greater. More preferably, the upper limit for the mixing amount of ZnO is 10 phr, and the upper limit for the mixing amount of MgO is 15 phr. In addition, the total mixing amount for ZnO and MgO is preferably in the range of 6–15 phr.

With respect to heat resistance, H-NBR is peroxide vulcanized and except for the acid acceptors described above, the types of vulcanization compounding ingredients are not restricted. Preferably, organic peroxide vulcanization is conducted. Any organic peroxide can be selected and used. For example, various monoperoxy compounds or diperoxy compounds can be used individually or two or more types can be used together.

Monoperoxy compounds include dicumyl peroxide, diacyl peroxide (for example benzoyl peroxide), di-t-butyl peroxide, t-butyl peroxide acetate, t-butyl peroxy isopropyl carbonate, peroxy ester (for example, t-butyl peroxy benzoate), and the like. Diperoxy compounds include 2,5-dimethyl-2,5-di-(t-butyl peroxy)-hexyne-3, 2,5-dimethyl-2,5-di-(t-butyl peroxy)-hexane, α,α'-bis(t-butyl peroxy)-p-diisopropyl benzene, 2,5-dimethyl-2,5-di-(benzoyl peroxy)-hexane, and the like.

The mixing amount of the organic peroxide will depend on the type of the organic peroxide. For example, when dicumyl peroxide is used by itself, approximately 0.5–8 phr is preferred. The mechanical strength of H-NBR may be inadequate when the mixing amount of dicumyl peroxide is less than 0.5 phr. If the mixing amount of dicumyl peroxide exceeds 8 phr, the non-vulcanized molded body may be easily scorched.

Furthermore, silica fillers, age resistors, carbon black, plasticizers, co-crosslinking agents (for example, TAIC and TMPTMA), and the like can be mixed with H-NBR, as needed.

Outer Layer of the Inner Pipe

Acrylic rubber (ACM), which constructs the outer layer 4 of the inner pipe 2, is an epoxy cross-linking type of ACM. "Acrylic rubber" is a general term encompassing acryl rubber and blend rubbers of this and other types of rubber.

Examples of epoxy cross-linking type ACM include various monomer compositions formed by copolymerization of any one or more monomers selected from the following monomer group 1 through monomer group 11 and any monomer selected from the following epoxy cross-linking monomer group:

Monomer group 1: Methyl acrylate, ethyl acrylate, n-propyl acrylate, isobutyl acrylate, n-butyl acrylate, n-pentyl acrylate, n-hexyl acrylate, n-octyl acrylate, or 2-ethyl hexyl acrylate.

Monomer group 2: Alkoxy alkyl acrylate group. For example, 2-methoxy ethyl acrylate, 2-ethoxy ethyl acrylate, 2-(n-propoxy) ethyl acrylate, 2-(n-butoxy) ethyl acrylate, 3-methoxy propyl acrylate, 3-ethoxy propyl acrylate, 2-(n-propoxy) propyl acrylate, or 2-(n-butoxy) propyl acrylate.

Monomer group 3: Fluorine containing acrylate group. For example, 1,1-dihydro perfluoro ethyl (meta) acrylate, 1,1-dihydro perfluoro propyl (meta) acrylate, 1,1,5-trihydro perfluoro hexyl (meta) acrylate, 1,1,2,2-tetrahydro perfluoro propyl (meta) acrylate, 1,1,7-trihydro perfluoro heptyl (meta) acrylate, 1,1-dihydro perfluoro octyl (meta) acrylate, or 1,1-dihydro perfluoro decyl (meta) acrylate.

Monomer group 4: Hydroxyl group containing acrylate group. For example, 1-hydroxy propyl (meta) acrylate, 2-hydroxy propyl (meta) acrylate, or hydroxy ethyl (meta) acrylate.

Monomer group 5: Tertiary amino group containing acrylate group. For example, diethyl amino ethyl (meta) acrylate or dibutyl amino ethyl (meta) acrylate.

Monomer group 6: Methacrylate group. For example, methyl methacrylate or octyl methacrylate.

Monomer group 7: Alkyl vinyl ketone group. For example, methyl vinyl ketone.

Monomer group 8: Vinyl and allyl ether group. For example, vinyl ethyl ether or allyl methyl ether.

Monomer group 9: Vinyl aromatic compound group. For example, styrene, α-methyl styrene, chlorostyrene, or vinyl toluene.

Monomer group 10: Vinyl nitryl group. For example, acrylonitrile or methacrylonitrile.

Monomer group 11: Ethylene unsaturated compound group. For example, ethylene, propylene, vinyl chloride, vinylidene chloride, vinyl fluoride, vinylidene fluoride, vinyl propionate, or alkyl fumarate.

Epoxy cross-linking monomer group: For example, glycidyl acrylate, allyl glycidyl ether, or methaallyl glycidyl ether.

A vulcanizing agent or vulcanization accelerator such as an ammonium salt is preferably mixed into the ACM. When ammonium salt is used as a vulcanizing agent or vulcanization accelerator, a compound or compound group as related to one of the following (1)–(3) or a combination of two or more of any of (1)–(3) is preferable:

(1) ammonium benzoate;

(2) isocyanuric acid, quaternary ammonium salt, and diphenyl urea; and (3) imidazole, thiourea, and quaternary ammonium salt.

The mixing amount of ammonium salt with respect to ACM is not restricted. However, the mixing amount of ammonium salt is preferably approximately 0.1–3 phr. When the amount of ammonium salt is below this range, there may be slightly reduced bonding with ACM. When the amount of ammonium salt exceeds this range, the workability of the non-vulcanized molded body may be reduced and the non-vulcanized molded body may become easily scorched.

In addition, small amounts of silica fillers can be mixed into the ACM, which constructs the outer layer of the inner pipe. Age resistors, carbon black, plasticizers, processing aids (paraffin, for example), and the like are added, as needed.

Embodiments

Preparation of H-NBR Non-Vulcanized Compositions, NBR Non-Vulcanized Compositions, and ACM Non-Vulcanized Compositions Table 1 shows H-NBR non-vulcanized compositions and NBR non-vulcanized compositions, which were prepared using an open roll, according to the proportions shown in columns A–F. These non-vulcanized compositions are used to construct the inner layer of the rubber inner pipe of the heat resistant fuel hose (described later in Table 3 as the "inner layer rubber"). Table 2 shows ACM non-vulcanized compositions, which were prepared using an open roll, according to the proportions shown in columns 1–6. These non-vulcanized compositions are used to construct the outer layer of the rubber inner pipe of the heat resistant fuel hose (described later in Table 3 as the "middle layer rubber"). The numerical values in Tables 1 and 2 indicate the number of parts by weight.

TABLE 1

|  | A | B | C | D | E | F |
|---|---|---|---|---|---|---|
| Zetpol 2000 | 100 | 100 | 100 | 100 | 100 | — |
| Nipol DN202 | — | — | — | — | — | 100 |
| Zinc oxide | 5 | 5 | 2 | 5 | — | 5 |
| Magnesium oxide | 5 | 10 | 2 | — | 5 | 5 |
| FEF Carbon | 50 | 50 | 50 | 50 | 50 | 50 |
| Plasticizer | 20 | 20 | 20 | 20 | 20 | 20 |
| TAIC | 2 | 2 | 2 | 2 | 2 | 2 |
| Dicumyl peroxide | 4 | 4 | 4 | 4 | 4 | 4 |

TABLE 2

|  | 1 | 2 | 3 | 4 | 5 | 6 |
|---|---|---|---|---|---|---|
| Nipol AR53 | 100 | 100 | 100 | 100 | 100 | — |
| Vamac G | — | — | — | — | — | 100 |
| Stearic acid | 1 | 1 | 1 | 1 | 1 | 1 |
| HAF Carbon | 60 | 60 | 60 | 60 | 60 | 60 |
| Plasticizer | 10 | 10 | 10 | 10 | 10 | 10 |
| Ammonium benzoate | 1.5 | — | — | — | — | — |
| Isocyanuric acid | — | 0.6 | — | — | — | — |
| Quaternary ammonium salt | — | 1.8 | 0.5 | — | — | — |
| Diphenyl urea | — | 1.3 | — | — | — | — |
| Imidazole | — | — | 0.5 | 0.5 | — | — |
| Trimethyl thio urea | — | — | 0.3 | — | — | — |
| Hexamethylene diamine carbamate | — | — | — | — | 1.5 | 1.5 |
| Diortho tolyl guanidine | — | — | — | — | 4 | 4 |

In Table 1, Zetpol 2000 is an H-NBR manufactured by Nippon Zeon Company, and Nipol DN202 is an NBR manufactured by Nippon Zeon Company. In Table 2, Nipol AR53 is an epoxy cross-linking type ACM manufactured by Nippon Zeon Company, and Vamac G is a carboxyl cross-linking type ACM manufactured by the DuPont Company.

Furthermore, in order to construct the outer layer rubber of the heat resistant fuel hose, a general mixture of polyethylene chloride rubber (CM) non-vulcanized composition was prepared using an open roll.

TABLE 3

|  | Material Construction | | | | Vulcanized Bonding of Inner Layer Rubber and Middle Layer Rubber | | | | |
|---|---|---|---|---|---|---|---|---|---|
|  | Inner Layer | Middle Layer | | | Normal Conditions | | Aged With Sealed Light Oil (100° C. for 240 Hours) | | Hose Seal Test |
|  | Rubber H-NBR or NBR | Rubber Acrylic Rubber | Reinforcement Layer | Outer Layer Rubber | Bonding Strength (N/25 mm) | Interface Conditions | Bonding Strength (N/25 mm) | Interface Conditions | Dry Heat Aged at 150° C. for 500 Hours |
| Embodiment 1 | A | 2 | polyester thread | CM | 65 | rubber damage | 50 < (tear) | rubber damage | ○ |
| Embodiment 2 | B | 2 | polyester thread | CM | 87 < (tear) | rubber damage | 50 < (tear) | rubber damage | ○ |
| Embodiment 3 | B | 1 | polyester thread | CM | 60 | rubber damage | 50 < (tear) | rubber damage | ○ |
| Embodiment 4 | B | 3 | polyester thread | CM | 78 | rubber damage | 50 < (tear) | rubber damage | ○ |
| Comparative Example 1 | C | 2 | polyester thread | CM | 28 | interface peeling | — | — | — |
| Comparative Example 2 | D | 2 | polyester thread | CM | 20 | interface peeling | — | — | — |
| Comparative Example 3 | E | 2 | polyester thread | CM | 60 | rubber damage | 50 < (tear) | rubber damage | X |
| Comparative Example 4 | F | 2 | polyester thread | CM | 90 < (tear) | rubber damage | 50 < (tear) | rubber damage | X |
| Comparative Example 5 | B | 4 | polyester thread | CM | 22 | interface peeling | — | — | — |
| Comparative Example 6 | B | 5 | polyester thread | CM | 10 | interface peeling | — | — | — |
| Comparative Example 7 | B | 6 | polyester thread | CM | 11 | interface peeling | — | — | — |

Creation of the Rubber Inner Pipe and Creation of the Heat Resistant Fuel Hose

The H-NBR non-vulcanized compositions or NBR non-vulcanized compositions mixed according to columns A–F of Table 1 and the ACM non-vulcanized compositions mixed according to columns 1–6 of Table 2 undergo a simultaneous two-layer extrusion. As a result, the inner layer is comprised of the H-NBR non-vulcanized composition or the NBR non-vulcanized composition, and the outer layer is comprised of the ACM non-vulcanized composition. The thickness of the inner layer and outer layer are both 1 mm. The combinations of these two layers and the construction of each layer are shown in Table 3 under the "inner layer rubber" and "middle layer rubber" for each of Embodiments 1–4 and Comparative Examples 1–7.

After conducting direct steam vulcanization at 160° C. for 45 minutes, hot air vulcanization at 160° C. for 8 hours is conducted. As a result, the vulcanized rubber inner pipes of Embodiments 1–4 and Comparative Examples 1–7 were constructed.

The H-NBR non-vulcanized compositions or NBR non-vulcanized compositions mixed according to columns A–F of Table 1 and the ACM non-vulcanized compositions mixed according to columns 1–6 of Table 2 undergo a separate, simultaneous two-layer extrusion. As a result, the inner layer is comprised of the H-NBR non-vulcanized composition or the NBR non-vulcanized composition, and the outer layer is comprised of the ACM non-vulcanized composition. The thickness of the inner layer and outer layer are both 1 mm. A reinforcement thread layer on the outer perimeter of outer layer was constructed by braiding polyester reinforcement thread. Furthermore, the CM non-vulcanized composition described above was extruded to cover the outer perimeter of the reinforcement thread layer. After direct steam vulcanizing the non-vulcanized fuel hoses at 160° C. for 45 minutes, hot air vulcanization was conducted at 160° C. for 8 hours to produce the heat resistant fuel hoses of Embodiments 1–4 and Comparative Examples 1–7.

In the rubber inner pipes and heat resistant fuel hoses described above, the division between "Embodiment" and "Comparative Example" in Table 3 is only used for relative convenience. There are comparative examples shown in Table 3 that can be embodiments of the present invention.

Evaluation of the Vulcanized Rubber Inner Pipe
Peeling Test

The vulcanized rubber inner pipes of each of the embodiments and comparative examples described above were subjected to a peeling test according to JIS K6330. The bonding strength (N/25 mm) between the H-NBR sheet or NBR sheet and the ACM sheet and the interface conditions of both sheets were evaluated. These results are shown in Table 3. In the "Bonding Strength" column of Table 3, "90<(tear)" indicates that the sheet was torn while peeling and the measurements at 90 N/25 mm or greater could not be measured. In the "Interface Conditions" column of Table 3, "interface peeling" indicates that there was peeling along the interface of the sheets without any damage to either sheet. Additionally, "rubber damage" indicates that there was damage to the sheet, i.e., a portion of the material remained on top of the companion sheet, during peeling.

Evaluation with Light Oil Enclosed

Light oil was sealed in the vulcanized rubber inner pipe of the embodiments and comparative examples described above. After aging at 100° C. for 240 hours, a peeling test according to JIS K6330, which is similar to the peeling test described above, was conducted. The bonding strength (N/25 mm) and condition of the peeling interface were evaluated. However, the hoses that had "interface peeling" as the interface condition in the peeling test under normal conditions were not evaluated. The results are shown in Table 3. As shown in Table 3, the results are consistent with the results of the peeling test under normal conditions.

Evaluation of Vulcanized Heat Resistant Fuel Hose
Seal Test

The vulcanized heat resistant fuel hoses of each of the embodiments and comparative examples were dry heat aged at 150° C. for 500 hours, and a seal test was conducted. In the seal test, a steel pipe with a fluorine resin coating on its surface was inserted into one end of each of the heat resistant fuel hoses and fastened using a clamp jig. Dry heat aging of 150° C. for 500 hours was conducted in an oven. Next, on the other end of the heat resistant fuel hose, pressure was raised by a hydraulic pump at a rate of 0.6 MPa/min, and the seal pressure after dry heat aging was measured.

In practice, the seal pressure after dry heat aging as described above is preferably 0.5 MPa or greater. Therefore, the embodiments and comparative examples with measurements of 0.5 MPa or greater are indicated by an "O" in the "Hose Seal Test" column of Table 3. The embodiments and comparative examples with measurements of less than 0.5 MPa are indicated by an "X". Those with "interface peeling" as the interface condition from the peeling test under normal conditions were not evaluated.

While the preferred embodiment has been described, variations thereto will occur to those skilled in the art within the scope of the present inventive concepts which are delineated by the following claims.

What is claimed is:

1. A heat resistant fuel hose comprising:
   a rubber inner pipe comprising:
      an inner pipe inner layer comprising a peroxide vulcanized mixture of hydrogenated acrylonitrile butadiene rubber (H-NBR), zinc oxide (ZnO), and magnesium oxide (MgO); and
      an inner pipe outer layer comprising an epoxy cross-linking acrylic rubber (ACM) vulcanized bonded to said inner pipe inner layer, wherein:
   the amount of said ZnO in said peroxide vulcanized mixture is 5 phr or greater; and
   the amount of said MgO in said peroxide vulcanized mixture is 5 phr or greater.

2. A heat resistant fuel hose as described in claim 1, wherein said H-NBR is a hydrogenated or a partially hydrogenated unsaturated nitrile—conjugated diene copolymer rubber.

3. A heat resistant fuel hose as described in claim 1, wherein said H-NBR comprises:
   an unsaturated nitrile
   a conjugated diene; and
   a hydrogenating unit portion selected from the group consisting of an ethylene unsaturated monomer other than unsaturated nitrile, a conjugated diene, or a combination thereof.

4. A heat resistant fuel hose as described in claim 3, wherein said H-NBR comprises:
   25–45% by weight based upon the total weight of said H-NBR of said unsaturated nitrile;
   5% by weight or less based upon the total weight of said H-NBR of said conjugated diene; and
   50–75% by weight based upon the total weight of said H-NBR of said hydrogenating unit portion.

5. A heat resistant fuel hose as described in claim 1, wherein:
   said amount of said ZnO in said peroxide vulcanized mixture is 5–10 phr; and
   said amount of said MgO in said peroxide vulcanized mixture is 5–15 phr.

6. A heat resistant fuel hose as described in claim 1, wherein said peroxide vulcanized H-NBR is vulcanized by organic peroxide vulcanization.

7. A heat resistant fuel hose as described in claim 6, wherein an organic peroxide used in said organic peroxide vulcanization comprises one or more members selected from the group consisting of a monoperoxy compound and a diperoxy compound.

8. A heat resistant fuel hose as described in claim 7, wherein said monoperoxy compound is selected from the group consisting of dicumyl peroxide, diacyl peroxide, di-t-butyl peroxide, t-butyl peroxide acetate, t-butyl peroxy isopropyl carbonate, and peroxy ester.

9. A heat resistant fuel hose as described in claim 7, wherein said diperoxy compound is selected from the group consisting of 2,5-dimethyl-2,5-di-(t-butyl peroxy)-hexyne-3, 2,5-dimethyl-2,5-di-(t-butyl peroxy)-hexane, α,α'-bis(t-butyl peroxy)-p-diisopropyl benzene, and 2,5-dimethyl-2,5-di-(benzoyl peroxy)-hexane.

10. A heat resistant fuel hose as described in claim 7, wherein said organic peroxide is dicumyl peroxide in an amount of 0.5–8 phr.

11. A heat resistant fuel hose as described in claim 1, wherein said ACM is a mixture which further comprises an ammonium salt.

12. A heat resistant fuel hose as described in claim 11, wherein said ammonium salt is selected from the group consisting of:
   (1) ammonium benzoate;
   (2) isocyanuric acid, quaternary ammonium salt, and diphenyl urea;
   (3) imidazole, thiourea, and quaternary ammonium salt; and
   (4) a combination of any of (1), (2), and (3).

13. A heat resistant fuel hose as described in claim 11, wherein the amount of said ammonium salt is 0.1–3 phr.

14. A heat resistant fuel hose as described in claim 1, wherein said ACM is a mixture which further comprises a member selected from the group consisting of silica filler, age resistor, carbon black, plasticizer, processing aid, and any combination of any of the foregoing.

15. A heat resistant fuel hose as described in claim 1, further comprising one or more layers selected from the group consisting of a reinforcement thread layer, a reinforcement wire layer, a rubber layer, and a resin layer on an outer perimeter of said rubber inner pipe.

16. A heat resistant fuel hose as described in claim 1, further comprising:
   a reinforcement thread layer, and
   a rubber outer pipe, wherein:
   said reinforcement thread layer and said rubber outer pipe are located on an outer perimeter of said rubber inner pipe.

17. A heat resistant fuel hose as described in claim 16, wherein said rubber outer pipe comprises a member selected from a group consisting of ACM, NBR, NBR-PVC, EPDM, EPM, CM, CSM, CR, and a blend rubber of two or more of these members.

18. A heat resistant fuel hose as described in claim 1, wherein said heat resistant fuel hose is a diesel fuel hose.

* * * * *

UNITED STATES PATENT AND TRADEMARK OFFICE
CERTIFICATE OF CORRECTION

PATENT NO. : 6,920,901 B2
DATED : July 26, 2005
INVENTOR(S) : Shinobu Kanbe et al.

It is certified that error appears in the above-identified patent and that said Letters Patent is hereby corrected as shown below:

Title page,
Item [*] Notice, please insert -- This patent is subject to a terminal disclaimer --.

Signed and Sealed this

Eighth Day of November, 2005

JON W. DUDAS
*Director of the United States Patent and Trademark Office*